United States Patent
Hecht

(10) Patent No.: US 11,210,387 B2
(45) Date of Patent: Dec. 28, 2021

(54) DETECTING AND PREVENTING UNAUTHORIZED CREDENTIAL CHANGE

(71) Applicant: CyberArk Software Ltd., Petach-Tikva (IL)

(72) Inventor: Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 195 days.

(21) Appl. No.: 15/998,532

(22) Filed: Aug. 16, 2018

(65) Prior Publication Data

US 2020/0057848 A1    Feb. 20, 2020

(51) Int. Cl.
*G06F 21/45* (2013.01)
*G06F 21/46* (2013.01)
(Continued)

(52) U.S. Cl.
CPC ............ *G06F 21/45* (2013.01); *H04L 63/083* (2013.01); *G06F 21/41* (2013.01); *G06F 21/43* (2013.01);
(Continued)

(58) Field of Classification Search
CPC .......... G06F 21/45; G06F 21/31; G06F 21/43; G06F 21/34; G06F 21/41; G06F 21/46; G06F 21/64; H04L 63/08; H04L 63/083; H04L 63/04; H04L 63/0407; H04L 9/32; H04L 9/3273; H04L 9/0863; H04L 2463/081; H04L 63/105; H04L 63/062; H04L 9/0656; H04L 67/02; H04L 9/0643; H04L 9/3226; H04L 9/3247; H04L 9/3239; H04L 2209/38; G06Q 20/40
(Continued)

(56) References Cited

U.S. PATENT DOCUMENTS 6,993,658 B1 * 1/2006 Engberg .................. G06F 21/43
                                                                   379/114.2
8,056,123 B2 * 11/2011 Correl .................... H04L 63/105
                                                                      726/6
(Continued)

OTHER PUBLICATIONS

Passwords and Hacking: the jargon of hashing, salting and SHA-2 explained by Samuel Gibbs (pp. 6) Dated: Thu Dec. 15, 2016.*
(Continued)

*Primary Examiner* — Samson B Lemma
*Assistant Examiner* — Ali H. Cheema
(74) *Attorney, Agent, or Firm* — Finnegan, Henderson, Farabow, Garrett & Dunner, LLP

(57) ABSTRACT

Techniques include securely maintaining data associated with a plurality of authentication credentials; generating, as a function of the data associated with a selected group of the plurality of authentication credentials, a secret data element; making available, the secret data element, to be embedded in a first authentication credential; identifying an attempt to change the first authentication credential, the attempt including new authentication credential data to replace data in the first authentication credential; validating, conditional on whether the new authentication credential data includes the secret data element, the new authentication credential data; and determining, based on the validating, whether to perform a control action based on the new authentication credential data.

25 Claims, 5 Drawing Sheets

(51) Int. Cl.
*G06F 21/43* (2013.01)
*G06F 21/41* (2013.01)
*H04L 29/06* (2006.01)
*G06F 21/64* (2013.01)
*H04L 9/32* (2006.01)

(52) U.S. Cl.
CPC .............. *G06F 21/46* (2013.01); *G06F 21/64* (2013.01); *H04L 9/32* (2013.01); *H04L 63/0407* (2013.01)

(58) Field of Classification Search
USPC ........... 726/6, 4, 22; 713/168, 184, 183, 193
See application file for complete search history.

(56) References Cited

U.S. PATENT DOCUMENTS

| | | | | | |
|---|---|---|---|---|---|
| 8,769,637 | B2* | 7/2014 | Janzen | ................... | H04L 9/3226 726/5 |
| 8,918,849 | B2* | 12/2014 | Talamo | ................. | H04L 9/3273 726/6 |
| 9,088,556 | B2* | 7/2015 | Truskovsky | ............ | G06F 21/45 |
| 10,956,560 | B1* | 3/2021 | Sanchez | ................ | H04L 9/0643 |
| 2006/0036857 | A1* | 2/2006 | Hwang | ................... | G06F 21/31 713/168 |
| 2006/0230437 | A1* | 10/2006 | Boyer | ................... | H04L 63/062 726/4 |
| 2007/0006305 | A1* | 1/2007 | Florencio | ............ | H04L 63/1483 726/22 |
| 2009/0327740 | A1* | 12/2009 | Schneider | ............. | H04L 9/3236 713/183 |
| 2012/0297205 | A1* | 11/2012 | Yuen | ....................... | G06F 21/44 713/193 |
| 2014/0032922 | A1* | 1/2014 | Spilman | ................ | H04L 9/0643 713/184 |
| 2014/0325622 | A1* | 10/2014 | Luk | ..................... | H04L 63/0823 726/6 |
| 2015/0254452 | A1* | 9/2015 | Kohlenberg | .......... | G06F 21/554 726/6 |
| 2016/0085962 | A1* | 3/2016 | Sokolov | .................. | G06F 21/31 726/6 |
| 2017/0346797 | A1* | 11/2017 | Yedidi | ..................... | H04L 63/14 |
| 2018/0121636 | A1* | 5/2018 | Schiffman | ............... | G06F 21/34 |
| 2018/0144122 | A1* | 5/2018 | Dymond | ................. | G06F 21/41 |
| 2018/0337957 | A1* | 11/2018 | Chen | ..................... | H04L 63/205 |
| 2019/0007387 | A1* | 1/2019 | Jin | ......................... | G06F 16/951 |
| 2019/0007428 | A1* | 1/2019 | Moen | ..................... | H04L 67/02 |
| 2020/0052899 | A1* | 2/2020 | Finlow-Bates | ....... | H04L 9/0656 |

OTHER PUBLICATIONS

Password Secured Systems and Negative Authentication by Alvaro Madero (B.S. Electronic Systems Engineering) pp. 55; Jun. 2013.*

* cited by examiner

DETECTING AND PREVENTING UNAUTHORIZED CREDENTIAL CHANGE

BACKGROUND

Attackers often try to gain enhanced or full privileges in target computing networks. One of the methods used by attackers is to compromise an account that has permission to reset passwords, credentials, access keys, or other privileged data. By compromising an account with permission to reset such data, attackers are able to reset the passwords, credentials, or access keys of all other privileged accounts available in the network and are thereby perform a number of malicious actions, which can greatly damage the target network.

Further, the same privileged escalation techniques can be abused by an insider, e.g., a user authorized to access a network with some legitimately granted privileges. For example, an insider may be authorized to operate from only one specific privileged account. The insider may use the account to reset the passwords of some or all the other privileged accounts, or to impersonate the other accounts. Thus, through these techniques of misusing and escalating privileges, a malicious insider may perform harmful actions on behalf of other users.

One basic security measure is the ability to reset and change passwords on a regular basis. For example, requiring the regular changing of passwords helps protect against a scenario in which an attacker steals a specific credential, and later tries to use it. In addition, it is more difficult for a potential attacker to guess or brute-force a periodically rotated password than a static password.

Some networks rely on a central policy manager (CPM) to manage and change passwords or credentials. A CPM may change the passwords of network entities based on a credential change policy that defines the password structure and complexity, the desired frequency of the password rotation, and other factors. The CPM may also update and maintain a secure credential vault for storing network passwords and credentials.

However, there is a need for techniques to ensure that passwords and other credentials are only being modified by the CPM and not by a malicious insider. For example, an insider or a potential attacker who either has, or has gained access to, a privileged account may use the account's permissions to reset passwords of other accounts and thereby expand their freedom of movement within the network. Therefore, the attacker may bypass the credential vault's secured password management by directly resetting the target account's passwords. Technological solutions are needed to address these deficiencies and vulnerabilities in existing approaches to password and credential management.

SUMMARY

The disclosed embodiments describe non-transitory computer readable media, systems, and methods for controlling changes to authentication credentials. For example, in an exemplary embodiment, there may be a non-transitory computer readable medium including instructions that, when executed by at least one processor, cause the at least one processor to perform operations for controlling changes to authentication credentials. The operations may comprise securely maintaining data associated with a plurality of authentication credentials, the plurality of authentication credentials being useable by a plurality of identities to obtain access to one or more access-controlled network resources; generating, as a function of the data associated with a selected group of the plurality of authentication credentials, a secret data element; making available, the secret data element, to be embedded in a first authentication credential; identifying an attempt to change the first authentication credential, the attempt including new authentication credential data to replace data in the first authentication credential; validating, conditional on whether the new authentication credential data includes the secret data element, the new authentication credential data; and determining, based on the validating, whether to perform a control action based on the new authentication credential data.

According to a disclosed embodiment, the data associated with the plurality of authentication credentials may include a plurality of hashes indicative of passwords associated with the plurality of identities.

According to a disclosed embodiment, the data associated with the plurality of authentication credentials may include data derived from passwords associated with the plurality of identities.

According to a disclosed embodiment, the data associated with the plurality of authentication credentials may include a plurality of hashes of authentication keys.

According to a disclosed embodiment, the data associated with the plurality of authentication credentials may be maintained in a common ledger, the common ledger storing updates to the plurality of authentication credentials.

According to a disclosed embodiment, generating the secret data element may include performing a tree hashing function to the data associated with the plurality of authentication credentials.

According to a disclosed embodiment, generating the secret data element may include concatenating two or more elements of the data associated with the plurality of authentication credentials and performing a hashing function on the concatenated data elements.

According to a disclosed embodiment, generating the secret data element may include performing a summation function to the data associated with the plurality of authentication credentials.

According to a disclosed embodiment, the control action may include rejecting the new authentication credential data.

According to a disclosed embodiment, the control action may include generating an alert identifying the new authentication credential data.

According to a disclosed embodiment, the control action may include disabling network access for an identity associated with the new authentication credential data.

According to a disclosed embodiment, the control action may include monitoring activity of an identity associated with the new authentication credential data.

According to a disclosed embodiment, the control action may include registering the new authentication credential data in a credential repository that securely maintains the data associated with the plurality of authentication credentials.

According to another disclosed embodiment, a method may be implemented for controlling changes to authentication credentials. The method may comprise securely maintaining data associated with a plurality of authentication credentials, the plurality of authentication credentials being useable by a plurality of identities to obtain access to one or more access-controlled network resources; generating, as a function of the data associated with a selected group of the plurality of authentication credentials, a secret data element; making available, the secret data element, to be embedded in a first authentication credential; identifying an attempt to change the first authentication credential, the attempt including new authentication credential data to replace data in the first authentication credential; validating, conditional on whether the new authentication credential data includes the secret data element, the new authentication credential data; and determining, based on the validating, whether to perform a control action based on the new authentication credential data.

According to another disclosed embodiment, the method may be performed by an agent on a domain controller in communication with a secure credentials repository that securely maintains the data associated with the plurality of authentication credentials.

According to another disclosed embodiment, the method may be performed by an agent on the one or more access-controlled network resources.

According to another disclosed embodiment, the method may be performed by a system that securely maintains the data associated with the plurality of authentication credentials.

According to another disclosed embodiment, the method may be performed by a system remote from a secure credentials repository that securely maintains the data associated with the plurality of authentication credentials.

According to another disclosed embodiment, the validating may include determining whether the new authentication credential data includes the secret data element in a predefined location.

According to another disclosed embodiment, the method may further comprise generating, as a function of the data associated with the plurality of authentication credentials, a plurality of secret data elements.

According to another disclosed embodiment, each of the plurality of secret data elements may be distinct and may be uniquely associated with each of the plurality of authentication credentials.

According to another disclosed embodiment, the secret data element may include a randomized data portion.

According to another disclosed embodiment, the secret data element may be made available together with a randomized data portion.

According to another disclosed embodiment, there may be a non-transitory computer readable medium including instructions that, when executed by at least one processor, cause the at least one processor to perform operations for controlling use of authentication credentials. The operations may comprise securely maintaining data associated with a plurality of authentication credentials, the plurality of authentication credentials being useable by a plurality of identities to obtain access to one or more access-controlled network resources; generating, as a function of the data associated with a selected group of the plurality of authentication credentials, a secret data element; making available, the secret data element, to be embedded in a first authentication credential; identifying an attempted privileged access session, the attempted privileged access session including an attempted use of a second authentication credential; determining whether the second authentication credential includes the secret data element; and determining, based on whether the second authentication credential includes the secret data element, whether to perform a control action based on the attempted privileged access session.

According to another disclosed embodiment, the attempted privileged access session may include an attempt by an identity to access an access-restricted network resource.

According to another disclosed embodiment, the attempted use of the second authentication credential may include the identity providing the second authentication credential to be authenticated.

According to another disclosed embodiment, the attempted use of the second authentication credential may include the identity attempting to access the second authentication credential from a secure storage resource to be authenticated.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
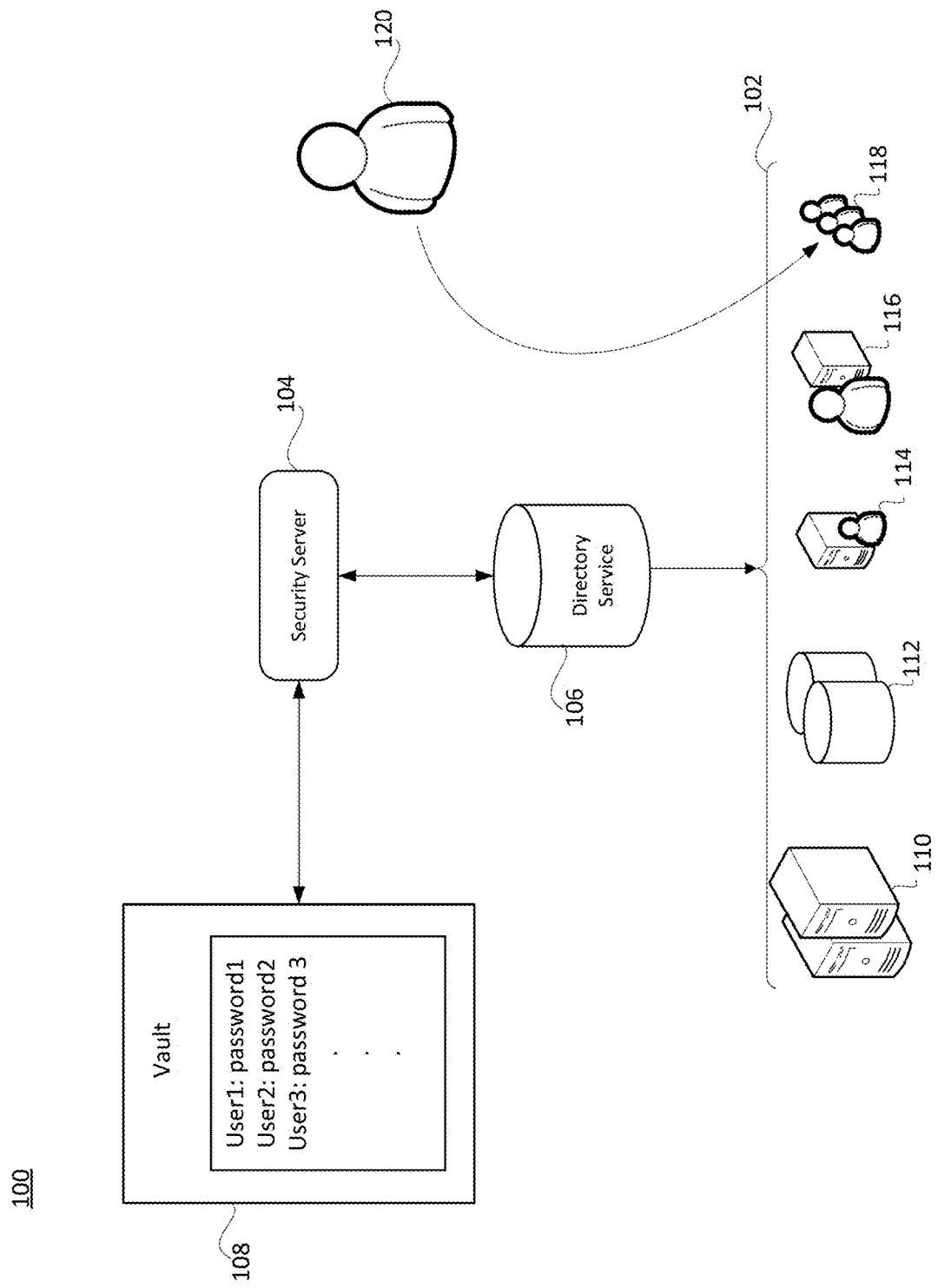
FIG. 1 is a block diagram of example system for controlling use of authentication credentials in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome many vulnerabilities and deficiencies of network security techniques with respect to credential and/or privilege management. The described techniques for controlling changes to authentication credentials may detect and prevent unauthorized credential change, while allowing authorized credential changes to occur seamlessly.

Reference will now be made in detail to the disclosed embodiments, examples of which are illustrated in the accompanying drawings.

Described herein are systems and methods for controlling changes to authentication credentials, which may be used to obtain access to access-restricted resources. Network environments may include access-restricted resources such as databases storing sensitive data, software development environments, restricted-use applications, secure web hosting servers, among various other types. Network administrators often attempt to maintain network security by rotating passwords on a regular basis, making it more difficult for an attacker to guess or to brute-force calculate the password of an account or resource associated with the network. However, networks are not currently safeguarded against the threat of an insider or attacker changing credentials from a compromised secured account. Moreover, networks are not able to selectively prohibit this form of improper privilege modification while still permitting legitimate privilege changes.

Current methods of preventing unauthorized credential change focus on securing and eliminating the "change credentials" permission in advance. For example, if all the accounts with the permission to reset or change a password are secured and operating in a legitimate way, then the risk of unauthorized credential change may be lessened. However, there is still a risk of a rogue insider or a potential outside attacker who might take a secured account and perform an unauthorized action with it.

Other approaches may scan a network and revoke the permissions of resetting or changing passwords from potentially compromised network entities. However, because reset or change password functionality is needed in the regular operation of an organization, certain accounts require these permissions. For example, a privileged account may be required to reset user passwords according to the network's security practices or if a user forgets his password. These and other shortcomings in existing approaches are solved through the techniques discussed below.

FIG. 1 depicts an exemplary system 100 of a network configuration. For example, system 100 can include network environment 102, central policy manager (CPM) 104, directory service 106, and credential vault 108, among other resources. Network environment 102 can be configured, for example, to host network resources including one or more servers 110, databases 112, workstations 114, user devices 116, user accounts 118, etc.

Network environment 102 can include a cloud-computing platform, consistent with disclosed embodiments. Examples of suitable cloud-computing platforms include, but are not limited to, Microsoft Azure™, Amazon Web Services (AWS)™, Google Cloud Platform™, IBM Cloud™, and similar systems. Further, network environment 102 may be an on-premises network of an organization, or a combination of an on-premises and a cloud-based network. Network environment 102 can be configured to associate permissions or privileges with entities deployed to network environment 102, such as identities 110-120. As a non-limiting example, when network environment 102 is an AWS-based network, network environment 102 can use AWS Identity and Access Management (IAM)™ to define permissions for entities deployed to network environment 102.

Network environment 102 may include one or more access-restricted resources, e.g., servers 110, databases 112, workstations 114, user devices 116, user accounts 118, or other access-restricted identities. A network resource may be, for example, any secure device, application, database, virtualized computing instance, or network that requires an identity to be authenticated before accessing the resource. An identity may be, for example, any account, person, machine, IoT device, application, or entity attempting to access a resource, such as a database, server, storage device, another identity, etc. in the network environment 102, such as resources 110-120, among others. Other exemplary network resources may be, for example, an IoT device, a personal computing device, a smartphone, a vehicle infotainment system, computer-embedded clothing, a building, an automated teller machine (ATM), a website, a mobile application, or various other types of network-accessible resources. In some embodiments, network resources (e.g., servers 110, databases 112, workstation 114, user devices 116, and user accounts 118) may require authentication, such as through the use of a privileged credential, e.g., password, SSH key, symmetric (e.g., public/private) key, or other type of cryptographic data or privileged access token, in order for another identity to access them.

Security server 104 may be a system including one or more processors configured to interact with network environment 102 to update and manage credentials for access-restricted resources (e.g., servers 110, databases 112, workstation 114, user device 116, and user accounts 118). Security server 104 may interact with access-restricted network resources through, or by reference to, directory service 106 (e.g., Microsoft Active Directory™ or Amazon Cloud Directory™) that enforces security policies of network environment 102. Security server 104 may securely store and update credentials in vault 108, such as passwords, keys, tokens, certificates, and other privilege data.

Vault 108 may be one or more databases storing credential information for one or more access-restricted network resources in network environment 102. Vault 108 may include one or more memory devices that store information and are accessed and/or managed through security server 104. By way of example, vault 108 may include Oracle™ databases, Sybase™ databases, or other relational databases or non-relational databases, such as Hadoop sequence files, HBase, or Cassandra. The databases or other files may include, for example, identities and permission policies, network resources accessed by an identity, an identity's attempt to access a network resource, and the like. Systems and methods of disclosed embodiments, however, are not limited to separate databases. Vault 108 may include computing components (e.g., database management system, database server, etc.) configured to receive and process requests for data stored in memory devices of vault 108 and to provide data from vault 108.

In the system 100 of FIG. 1, an attacker 120 may gain access to access-restricted network resources by compromising an identity 118 in network environment 102. For example, attacker 120 may guess or calculate an identity's password, and otherwise steal the password, and use the password to access network resources from that identity's account. In another example, attacker 120 may be an insider associated with an identity 118 in network environment 102 and thus have a valid password for an account with permissions to modify or create credentials for other identities in network environment 102. Once attacker 120 obtains a password for an identity (e.g., identity 118) with permissions to modify or create credentials and/or privileges for other identities in network environment 102, the attacker 120 may modify or create credentials and/or privileges, access secure resources, or access sensitive information without detection.

Figure 2:
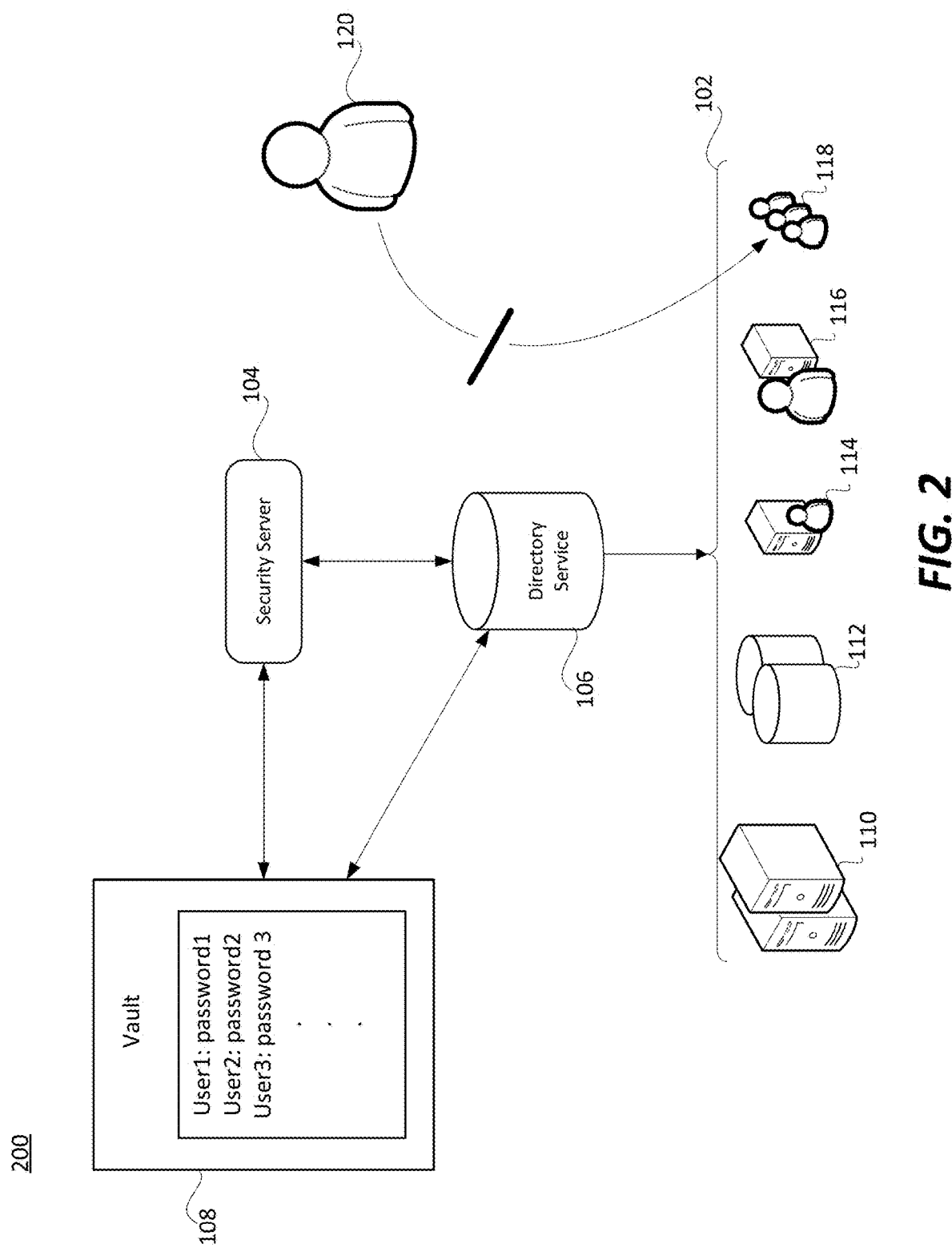
FIG. 2 is a block diagram of another example system for controlling use of authentication credentials in accordance with disclosed embodiments.

FIG. 2 depicts an exemplary system 200 in which modifications to credentials and/or privileges must be validated by security server 104 before being accepted and stored in vault 108. For example, in such a situation, the system 200 (e.g., via security server 104) blocks credential changes that are not initiated by the security server 104. Thus, even if an attacker 120 successfully gains control of an identity 118 account in the network environment 102, any attempts by the attacker 120 to manipulate or modify credentials will be denied, as discussed further below.

For example, in system 200, the generation of a new credential can be performed only by an entity (e.g., security server 104) having knowledge of all (or a defined group) of the credentials and knowing the secret logic algorithm required for calculating the secret data element of a credential. The credential generation process may involve creating new credentials based on all the other existing credentials and according to the secret logic algorithm. The secret logic algorithm may generate a secret data element that is unique to each credential, password, key, token, etc. In some embodiments, the secret data element is unique to a system environment (e.g., unique to an AWS™ or Azure™ environment, portion of an on-premises network, etc.). The secret data element may be calculated at the security server 104 based on the secret logic known only to security server 104. Once the secret data element is calculated, the secret data element may be embedded in each new valid generated credential, password, key, token, etc. Thus, each new generated credential, password, key, token, etc. may have a different and randomized secret data element. Once new credentials are generated, a validation process may determine whether the new credential contains the secret data element.

Figure 3:
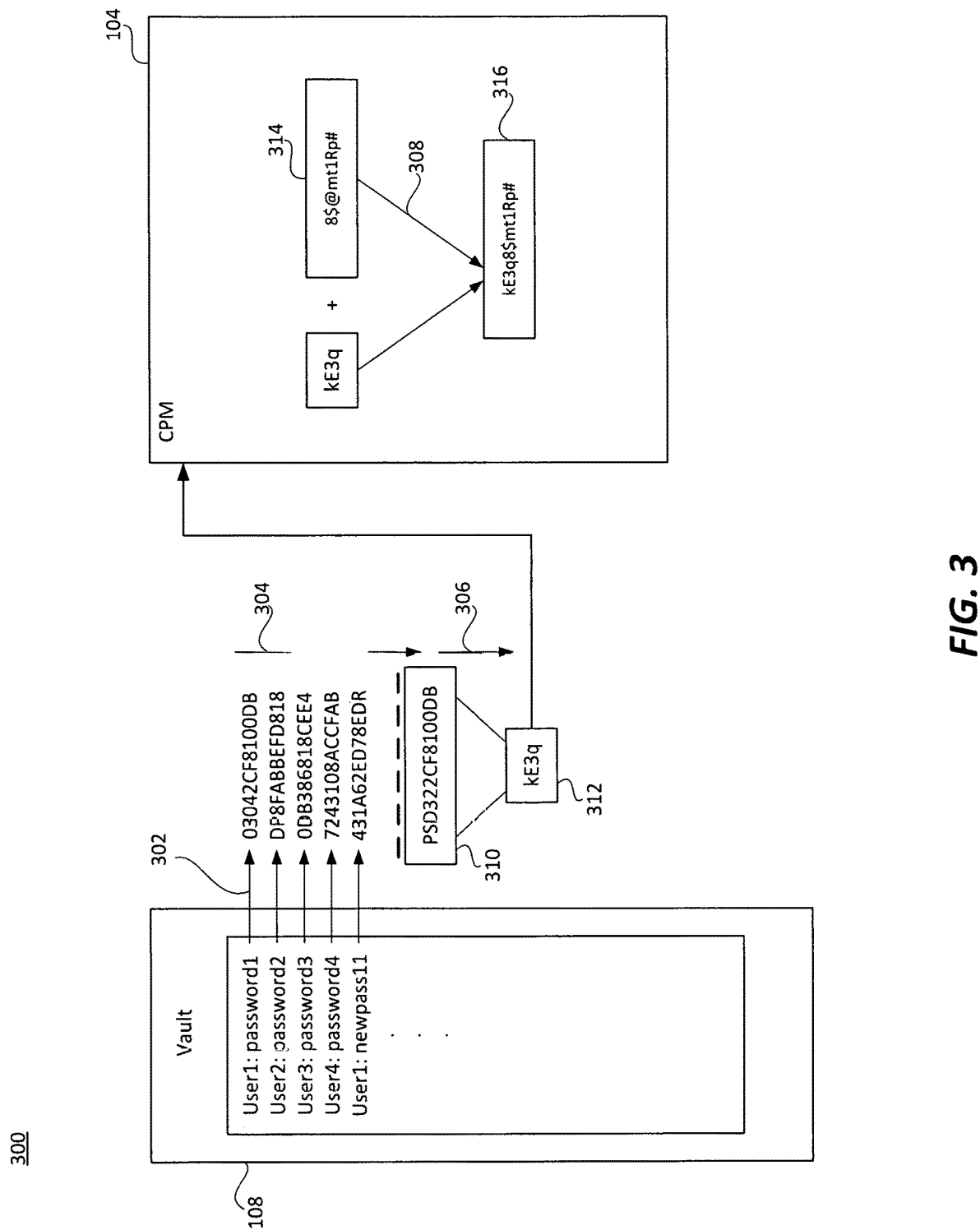
FIG. 3 is an example process flow diagram illustrating a technique of controlling use of authentication credentials in accordance with disclosed embodiments.

FIG. 3 depicts an exemplary process 300 for generating a secret data element in a system 200, consistent with disclosed embodiments. While an attacker, e.g., attacker 120, may only have access to the password corresponding to either his own account (e.g., if the attacker is an insider) or a compromised account, the security server 104 has access to all credentials/passwords of the network environment 102 that are stored in the vault 108. Additionally, only the security server 104 has access to the secret logic algorithm. Therefore, a potential attacker or a malicious insider cannot create valid passwords for target accounts.

At step 302, the system, e.g., through security server 104, may generate or access an individual hash of each credential/password stored in vault 108. In some embodiments, security server 104 may access the actual password stored in vault 108. Step 302 may be performed periodically (e.g., daily, monthly, etc.) in some embodiments. In other embodiments, step 302 may be performed upon demand (e.g., upon detection of a request for access to an access-restricted resource 110-118).

At step 304, the system 300 (e.g., through security server 104) may generate an intermediate value 310 from a set of one or more of the passwords or hashed passwords generated or accessed in step 302. For example, the intermediate value 310 may be generated using a password-dependent hash solution. In some embodiments, a password "blockchain" can be used in which every created block for each newly added password is connected or linked to another block. The intermediate value 310 resulting from the dependent hash of the password chain may be only known to security server 104, which knows all the passwords (from the beginning of the chain) that are stored in vault 108.

In another embodiment, the intermediate value 310 may be generated using a Merkel Tree hash, improved/advanced Merkel tree hash, or similar hashing tree technique that is constructed based on all the known password information. In another embodiment, the intermediate value 310 may be generated by concatenating all the passwords (e.g., previously stored passwords in vault 108) together and then performing a single hash. In another embodiment, the intermediate value 310 may be generated by calculating a sum of all the passwords, encrypting the sum, and storing a portion of the result. The portion that is stored by security server 104 may be chosen arbitrarily (e.g., the first several characters), based on a predefined portion, based on a designated portion that may change, etc.

At step 306, security server 104 generates a secret data element 312 by applying the secret logic algorithm, known only to security server 104, to intermediate value 310. The result may be stored in vault 108 or separately by security server 104. Thus, each password stored by vault 108 has a secret data element 312 that is unique and randomized since the secret data element depends on what passwords are stored in the vault 108 at the time of the new password generation. In some embodiments, hashes may be shared across the security server 104, directory service 106, vault 108, and the like. Further, in some embodiments, only a subset of passwords stored in vault 108 are used to compute a secret data element.

At step 308, security server 104 combines the secret data element 312 with one or more random bytes 314. The random bytes 314 may be generated, for example, through a random number generator, based on a defined cycling algorithm, etc. For example, the secret data element 312 may be concatenated with the random bytes 314 to form new password 316. In other embodiments, the secret data element 312 may be inserted into random bytes 314. In another embodiment, the random bytes 314 may be concatenated with secret data element 312.

Figure 4:
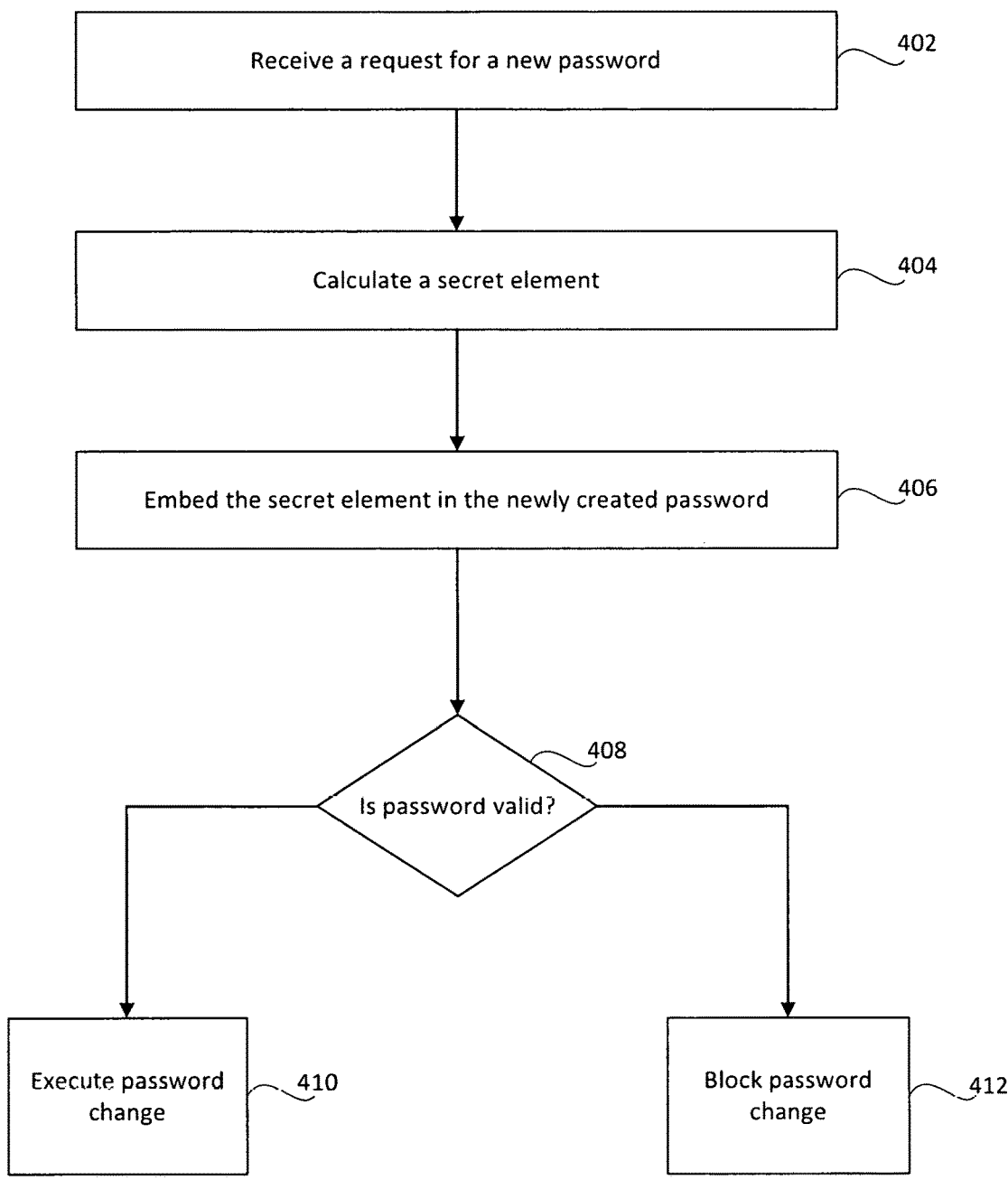
FIG. 4 is an example process flow diagram illustrating a technique of secure element calculation and password validation in accordance with disclosed embodiments.

FIG. 4 depicts an exemplary process 400 for generating and validating a new credential, password, token, key, etc. in a system (e.g., system 100 or 200), consistent with disclosed embodiments. In some embodiments, process 400 may be implemented via security server 104.

At step 402, security server 104 may receive a request for a new credential, password, token, key, certificate, etc. For example, security server 104 may receive an indication to rotate a password according to the network environment 102's security policy. The security policy may require a periodic update of passwords, an event-based update (e.g., based on a potential security threat, a request for access to an access-restricted resource, etc.), or another type of update. In another embodiment, an administrator may create a new account associated with an identity in network environment 102, thereby causing the security server 104 to initiate password generation for the new account.

At step 404, security server 104 may calculate a secret data element as described above with reference to FIG. 3. For example, as discussed above, the secret data element may be calculated based on a credential-dependent algorithm, a blockchain-based technique, a Merkel Tree technique, an advanced Merkel Tree technique, or other techniques.

At step 406, security server 104 may embed the secret data element in the newly created password as described in step 308 described with reference to FIG. 3. The secrete data element may be combined with random bytes, or in other combinations, as discussed above in connection with FIG. 3.

At step 408, security server 104 may validate the new password containing the secret data element. For example, if an account requests a password change on a domain controller (DC) (e.g., in response to an identity seeking access to an access-restricted network resource), the password may first be validated by a solution agent installed on the DC or on another target credential host. In some embodiments, the DC is integrated into the security server 104. In some embodiments, the agent may run other tasks as well and may not be solely dedicated to the validation process. The validation of the password by the solution agent will determine whether the newly generated password contains the secret data element. In some embodiments, the secret data element created by the vault is shared with the solution agent in advance.

In another embodiment, the solution agent may query the vault 108 for the secret data element "on-demand." For example, when a new password is being generated the solution agent may query the vault 108 on the specific account for which the password is going to be changed or created. The vault 108 may return the secret data element, which is in turn validated by the solution agent. In some embodiments, the communications between the vault 108 and the solution agent occur on top of secured and encrypted communication sessions (e.g., HTTPS).

In some embodiments, the secret data element may be embedded in the new password in multiple places and the agent will know how to detect it. For example, the secret data element may be added at the beginning of the newly requested password or embedded in the middle\end. The secret data element may be embedded in the same manner each time a new password is generated, or differently each time.

In another embodiment, a validation component can be installed before the DC in an inline network architecture, e.g., as a proxy. A request to the DC, for example, to change a password, may be directed through the validation component. The network commands to change the password may not be sent to the DC unless the validation component successfully validates the new password. In other embodiments, a third-party vendor, for example, providing a firewall, may implement a validation process that is built into the firewall's firmware.

If the new password is validated, at step 410, the new password is stored in vault 108 as a valid credential. However, if the new password is not valid, at step 412, system 200 may block the generation of the password. In some embodiments, system 100/200 (e.g., through security server 104) may generate an alert to send to one or more system administrators or a security team indicating that an unauthorized attempt to modify a password was made by a potential attacker.

As an exemplary implementation, 95% of the privileged accounts belonging to an organization may be managed securely with a password manager solution, e.g., security server 104, meaning that their respective passwords are stored securely, are not accessible from other accounts, are monitored, and the like. However, 5% of the organization's accounts may not be managed. If one of the non-managed privileged accounts is compromised, an attacker can reset the passwords for all the other 95% privileged accounts, as described with reference to FIG. 1. In this example, there is no safeguard mechanism for preventing unauthorized credential change. However, employing a system 200 having the configuration of that described with reference to FIG. 2, the attacker cannot change the passwords of the other privileged accounts because the attacker does not know the secret algorithm to determine the secret data element nor does the attacker know where to embed the secret data element within the new password. Further, even if the attacker were to guess or replicate the secret algorithm, the attacker could not calculate the secret data element because said calculation requires the attacker to know all the other password of all the other accounts. Thus, the attacker's malicious actions are limited to the specific compromised account. Moreover, when the attacker tries to change the password of another privileged account, the security server may detect the failed password change, block the change, and alert the security team of the organization. The alert may allow the security team to investigate the blocked request and mitigate the damage from the attack by discovering and eliminating the specific compromised account. Further, the security server may implement this restriction on improper password changes, while still permitting password changes that are allowable (e.g., those based on the calculated secret element).

In another example, the attacker may be a rogue employee who has authorized access to only 10% of the organization's privileged accounts, some of which are managed by the security server. As described above, even though the employee may access certain privileged accounts, the employee cannot create or modify passwords stored in the vault 108 without knowing every password stored in vault 108. The attacker is thus not able to compromise additional privileged accounts.

In another example, a newly installed application on organization systems may contain a bug causing the application to send a password change request to the DC. The system may detect the inadvertent password change, determine the request did not originate from the security server 104, and block the password change from proceeding. Accordingly, the bug will still not enable the attacker to change additional passwords.

Figure 5:
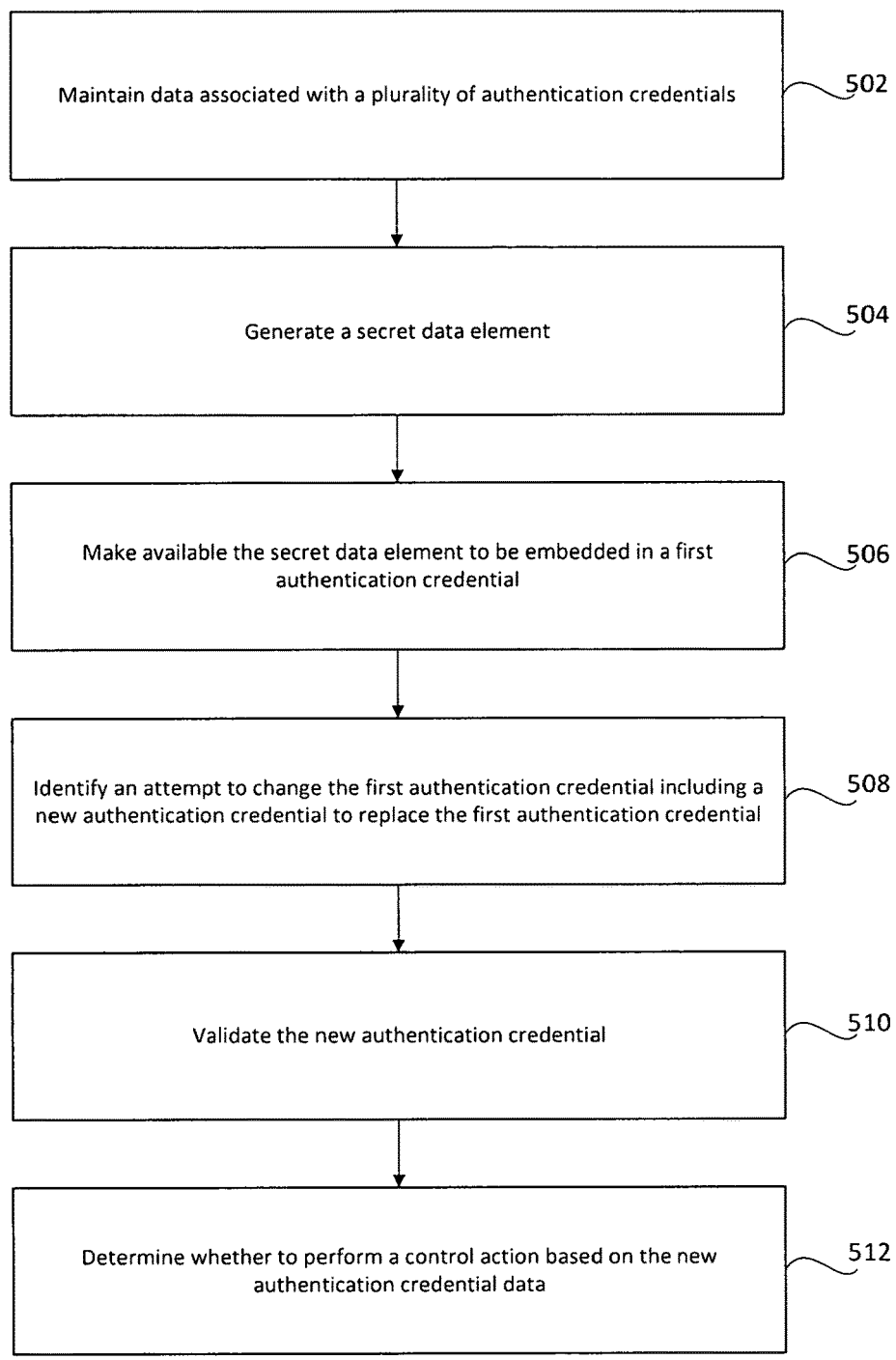
FIG. 5 is an example process flow diagram illustrating a technique of controlling use of authentication credentials in accordance with disclosed embodiments.

FIG. 5 is an exemplary process 500 for controlling changes to authentication credentials, consistent with disclosed embodiments. Process 500 may be executed, for example, by systems 100/200 as described with reference to FIGS. 1 and 2. In some embodiments, process 500 is performed by an agent on a DC in communication with a secure credentials repository, e.g., vault 108, that securely maintains the data associated with a plurality of authentication credentials. In another embodiment, process 500 is performed by a system that securely maintains the data associated with the plurality of authentication credentials, e.g., system 200, via security server 104. In some embodiments, the system may be remote from a secure credentials repository that securely maintains the data associated with the plurality of authentication credentials.

At step 502, the system may securely maintain data associated with a plurality of authentication credentials, e.g., data stored in vault 108, that are useable by a plurality of identities to obtain access to one or more access-controlled network resources, e.g., servers 110, databases 112, workstations 114, devices 116, accounts 118, and/or the like. In some embodiments, the data associated with the authentication credentials may include a plurality of hashes indicative of and/or data derived from passwords, keys, credentials, etc., associated with the plurality of identities. In some embodiments, the data may include a plurality of hashes of authentication keys. In other embodiments, the data that is stored include the actual passwords, keys, credentials, etc.

As previously described, in some embodiments, the data associated with the plurality of authentication credentials is maintained in a common ledger that stores updates to the plurality of authentication credentials. For example, as discussed above, a blockchain-based authentication technique may be used for determining am approved password-change process.

At step 504, the system may generate a secret data element as a function of the data associated with a selected group of the plurality of authentication credentials. Each secret data element may be distinct and uniquely associated with an authentication credential and may contain a randomized data portion. As previously described with reference to FIG. 2, the secret data element may be generated by performing a tree hashing function on the data associated with the plurality of authentication credentials. In another embodiment, the secret data element may be generated by concatenating two or more elements of the data associated with the plurality of authentication credentials and performing a hashing function on the concatenated data elements. In another embodiment, generating the secret data element may include performing a summation function of the data associated with the authentication credentials. Various other techniques for generating the secret data element are possible as well, as discussed above.

At step 506, the system may make the secret data element available to be embedded in a first authentication credential. As previously described, the location at which to embed the secret data element may be known only to security server 104.

At step 508, the system may identify an attempt to change the first authentication credential. The attempt may include, for example, new authentication credential data to replace the first authentication credential. In some embodiments, the attempt may be an attempt by an identity to access an access-restricted network resource. Such an attempt may occur as part of a malicious attack on a network environment or inadvertently due to user error or a bug in software used by the network environment.

At step 510, the system may validate the new authentication credential data based on whether the new authentication credential data includes the secret data element. In some embodiments, step 510 may further include determining if the new authentication credential data includes the secret data element in a predefined location.

At step 512, the system may determine, based on the validation of step 510, whether to perform a control action based on the new authentication credential data. In some embodiments, the control action may include rejecting the new authentication credential data if the secret data element was not validated in step 510. If the secret data element was not validated, the control action may also include generating an alert identifying the new authentication credential data. If the secret data element was not validated, the control action may include disabling network access for an identity associated with the new authentication credential data or monitoring activity of the identity.

If the secret data element is successfully validated at step 510, at step 512 the system may register the new authentication credential data in the credential repository.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for controlling changes to authentication credentials, the operations comprising:
   securely maintaining data associated with a plurality of authentication credentials, the plurality of authentication credentials being useable by a plurality of identities to obtain access to one or more access-controlled network resources;
   generating an intermediate value based on the data associated with a selected group of the plurality of authentication credentials;
   generating, based on application of a secret logic algorithm to the intermediate value, a secret data element;
   making available, the secret data element, to be embedded in a first authentication credential of the plurality of authentication credentials;
   identifying an attempt to change the first authentication credential, the attempt including new authentication credential data to replace data in the first authentication credential;
   validating, conditional on a determination whether the new authentication credential data includes the secret data element in a predefined location, the attempt to change the first authentication credential; and
   determining, based on the validating, whether to perform a control action based on the new authentication credential data.

2. The non-transitory computer readable medium of claim 1, wherein the data associated with the plurality of authentication credentials includes a plurality of hashes indicative of passwords associated with the plurality of identities.

3. The non-transitory computer readable medium of claim 1, wherein the data associated with the plurality of authentication credentials includes data derived from passwords associated with the plurality of identities.

4. The non-transitory computer readable medium of claim 1, wherein the data associated with the plurality of authentication credentials includes a plurality of hashes of authentication keys.

5. The non-transitory computer readable medium of claim 1, wherein the data associated with the plurality of authentication credentials is maintained in a common ledger, the common ledger storing updates to the plurality of authentication credentials.

6. The non-transitory computer readable medium of claim 1, wherein generating the secret data element includes performing a tree hashing function to the data associated with the selected group of the plurality of authentication credentials.

7. The non-transitory computer readable medium of claim 1, wherein generating the secret data element includes concatenating two or more elements of the data associated with the selected group of the plurality of authentication credentials and performing a hashing function on the concatenated data elements.

8. The non-transitory computer readable medium of claim 1, wherein generating the secret data element includes performing a summation function to the data associated with the selected group of the plurality of authentication credentials.

9. The non-transitory computer readable medium of claim 1, wherein the control action includes rejecting the new authentication credential data.

10. The non-transitory computer readable medium of claim 1, wherein the control action includes generating an alert identifying the new authentication credential data.

11. The non-transitory computer readable medium of claim 1, wherein the control action includes disabling network access for an identity associated with the new authentication credential data.

12. The non-transitory computer readable medium of claim 1, wherein the control action includes monitoring activity of an identity associated with the new authentication credential data.

13. The non-transitory computer readable medium of claim 1, wherein the control action includes registering the new authentication credential data in a credential repository that securely maintains the data associated with the plurality of authentication credentials.

14. A computer-implemented method, executed by one or more hardware processors, for controlling changes to authentication credentials, the method comprising:
　securely maintaining data associated with a plurality of authentication credentials, the plurality of authentication credentials being useable by a plurality of identities to obtain access to one or more access-controlled network resources;
　generating, by the one or more hardware processors, an intermediate value based on the data associated with a selected group of the plurality of authentication credentials;
　generating, based on application of a secret logic algorithm to the intermediate value, a secret data element;
　making available, the secret data element, to be embedded in a first authentication credential of the plurality of authentication credentials;
　identifying an attempt to change the first authentication credential, the attempt including new authentication credential data to replace data in the first authentication credential;
　validating, conditional on a determination whether the new authentication credential data includes the secret data element in a predefined location, the attempt to change the first authentication credential; and
　determining, based on the validating, whether to perform a control action based on the new authentication credential data.

15. The computer-implemented method of claim 14, wherein the method is performed by an agent on a domain controller in communication with a secure credentials repository that securely maintains the data associated with the plurality of authentication credentials.

16. The computer-implemented method of claim 14, wherein the method is performed by an agent on the one or more access-controlled network resources.

17. The computer-implemented method of claim 14, wherein the method is performed by a system that securely maintains the data associated with the plurality of authentication credentials.

18. The computer-implemented method of claim 14, wherein the method is performed by a system remote from a secure credentials repository that securely maintains the data associated with the plurality of authentication credentials.

19. The computer-implemented method of claim 14, wherein generating the secret data element, comprises generating a plurality of secret data elements.

20. The computer-implemented method of claim 19, wherein each of the plurality of secret data elements are distinct and are uniquely associated with each of the plurality of authentication credentials.

21. The computer-implemented method of claim 14, wherein the secret data element includes a randomized data portion.

22. The computer-implemented method of claim 14, wherein the secret data element is made available together with a randomized data portion.

23. A non-transitory computer readable medium including instructions that, when executed by at least one processor, cause the at least one processor to perform operations for controlling use of authentication credentials, the operations comprising:
　securely maintaining data associated with a plurality of authentication credentials, the plurality of authentication credentials being useable by a plurality of identities to obtain access to one or more access-controlled network resources;
　generating an intermediate value based on the data associated with a selected group of the plurality of authentication credentials;
　generating, based on application of a secret logic algorithm to the intermediate value, a secret data element;
　making available, the secret data element, to be embedded in a first authentication credential of the plurality of authentication credentials;
　identifying an attempted privileged access session, the attempted privileged access session including an attempted use of a second authentication credential, wherein the attempted privileged access session includes an attempt by an identity to access an access-restricted network resource;
　determining whether the second authentication credential includes the secret data element in a predefined location; and
　determining, based on whether the second authentication credential includes the secret data element, whether to perform a control action based on the attempted privileged access session.

24. The non-transitory computer readable medium of claim 23, wherein the attempted use of the second authentication credential includes the identity providing the second authentication credential to be authenticated.

25. The non-transitory computer readable medium of claim 23, wherein the attempted use of the second authentication credential includes the identity attempting to access the second authentication credential from a secure storage resource to be authenticated.

* * * * *